United States Patent Office 3,677,979
Patented July 18, 1972

3,677,979
SULFONATED PHENOL-ALDEHYDE RESINS
Raymond D. Beaulieu, North Wilbraham, Mass., assignor to Monsanto Company, St. Louis, Mo.
No Drawing. Continuation-in-part of application Ser. No. 769,368, Oct. 21, 1968, and a continuation-in-part of application Ser. No. 29,688, Apr. 17, 1970. This application Jan. 21, 1971, Ser. No. 108,594
Int. Cl. C08g 37/18
U.S. Cl. 260—2.2 C  11 Claims

ABSTRACT OF THE DISCLOSURE

Thermosettable water-soluble phenolic two-component mixed resin compositions having sulfonic acid groups chemically combined thereinto especially useful in the manufacture of porous ion-exchange media. These compositions are preferably prepared as aqueous solutions having a pH ranging from about 6.5 to 8.0. Methods for manufacture are described.

RELATED APPLICATIONS

This application is a continuation-in-part of my earlier filed application, U.S. Ser. No. 769,368, filed Oct. 21, 1968, and my earlier filed application, U.S. Ser. No. 29,688, filed Apr. 17, 1970.

BACKGROUND

In the art of ion-exchange resins derived from phenol and aldehyde and containing sulfonic acid groups, sulfonated resins are well known. Such prior art sulfonated phenol-aldehyde resins, however, are inherently characteristically always both crosslinked and substantially water insoluble even as made. Consequently, they generally are not suitable for use in those applications where resin solutions are employed, such as in treating (including impregnating uniformly) substrate materials, especially cellulosic materials in sheet form, so as to produce porous sulfonated phenolic resin treated media suitable for ion-exchange applications. Obviously, unless the resin is uniformly distributed through or over such substrate materials, and is bonded thereto, porous ion-exchange media cannot be made. The precured (crosslinked) and insoluble character of the prior art sulfonated phenolic resins generally prevents them from being used in the manufacture of such media.

The art has long sought a sulfonated phenol-aldehyde resin system which can be (1) prepared initially in the form of an aqueous solution; (2) used in such a solution form to treat preformed porous substrates, especially cellulosic sheets like paper, without causing appreciable substrate degradation or deterioration; and (3) thermoset by heat alone at relatively low temperatures within a brief time interval (say, below about 375° F. within times of less than about 6 minutes) to produce a water-insoluble resinous mass having chemically incorporated thereinto, and uniformly but randomly distributed therethrough in a controllable manner, sulfonic acid groups. By the present invention, such a resin system is provided both now abandoned.

Thus, for example, when cellulosic and other organic fibrous materials in woven and non-woven sheet-like or mat form are impregnated with such a resin system and then thermoset, there are produced articles of manufacture in sheet, mat or other (e.g. tubing) form having useful ion-exchange properties. Such thermoset articles of manufacture commonly display excellent tensile strength characteristics and minimum cellulose or other fiber degradation.

In addition to the above properties, the sulfonated phenolic resin systems of this invention display excellent storage stability characteristics when in aqueous solution form, so that they may be stored for extended intervals of time following preparation before use with little or no deterioration (including phase separation, solids precipitation, or the like).

SUMMARY

This invention is directed to new and very useful phenolic resin compositions and to a process for making same. The resin compositions are adapted for use as ion-exchange materials when thermoset. Such resin compositions comprise in combination both a first resin comprising a base catalyzed (e.g. above pH 7) condensate of formaldehyde with at least one phenol sulfonic acid characterized in its pure acid form by the general formula:

(1)

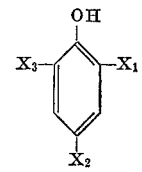

where $X_1$, $X_2$, and $X_3$ are each individually selected from the group consisting of hydrogen and —$SO_3H$, and, in any given molecule thereof, at least one of said X's is —$SO_3H$, and at least one other of said X's is hydrogen, and a second resin comprising a base catalyzed condensate of phenol with formaldehyde.

These compositions typically contain from about 10 to 2000 parts by dry weight of such second resin (preferably from about 30 to 1000) for each 100 parts by dry weight of such first resin. Also, in these compositions, the first resin and the second resin together are water soluble at a pH of about 7 to the extent that one part by weight of such a resin composition when in about a 55 weight percent water solution is dilutable with at least about 5 parts by weight of additional water without causing precipitation of such resin.

Especially at the time of use, such a resin composition is preferably in the form of an aqueous solution having a pH of from about 6.5 to 8.0, and containing from about 5 to 80 weight percent (dry weight basis), and preferably from about 30 to 60 weight percent, of such aforedescribed resin composition, with the balance up to 100 weight percent of any given such solution being water.

In such a resin composition, the second resin is preferably composed of phenol and formaldehyde in the combined mol ratio of from about 1.2:1 to 3:1 formaldehyde to phenol.

Both the first resin and the second resin in a given such resin composition can be made in a common reaction zone and in a common aqueous liquid phase sequentially.

Such a resin composition is thus prepared so as to thermoset by heat alone. Typical thermosetting conditions (especially after a cellulosic, fibrous, non-woven sheet member (e.g. paper) has been treated with such an aqueous solution of such resin composition and then dried to remove excess water) involve temperatures of from about 220 to 400° F. inversely applied for times of from about 3 to 20 minutes.

DETAILED DESCRIPTION

As indicated above, to prepare a first resin, at least one Formula 1 compound is contacted with a molar excess of formaldehyde in water using a base catalyst, the contacting being continued under time, temperature, and pressure conditions which taken together are at least sufficient to methylolate said phenol sulfonic acid, it being preferable to react all available hydrogens ortho and para to the hydroxyl group.

Typical reaction or contacting temperatures range from about 50° C. up to the boiling point (i.e. reflux conditions) of the reaction mixture (temperatures of from about 70° C. to 80° C. being preferred). Convenient reaction times typically range from about 20 minutes to 4 hours. Preferably, the pH is maintained in the range from about 7.5 to 10. At pH values above about 7.5, not only is the sulfonic acid salt formed, but also a sufficient percentage of phenate anions are formed to activate ortho and para positions on the phenyl nucleus relative to the hydroxyl group, which is desirable in methylolating Formula 1 compounds with formaldehyde. At pH values above about 10, the undesirable Canizzaro reaction can occur as a side reaction. Vacuum reflux conditions or other means can be used to limit condensation of product methylolated compounds and control reaction temperature (through steam evolution). Organic liquids may be present, but it is much preferred that at least 50 weight percent of the total liquid solvent be water.

To maintain the desired basic pH, any basic catalyst conventionally known to the art of resole resins can be employed, such as ammonium hydroxide or metal hydroxides of metals generally from Groups I-A and II-A of the Periodic Table of the Elements. As made, the methylolated, sulfonated products are thus in a salt form, cations present having been derived from the base catalyst used.

A prefered class of such a methylolated, sulfonated product is monomeric; contains only a single —$SO_3H$ group in the form of a metal salt or ammonium salt per molecule depending on the cations associated with the base catalyst employed in manufacture; and so is in salt form (i.e. is not neutralized or acidified); and has two —$CH_2OH$ (methylol) groups per molecule. The presence of two —$CH_2OH$ groups per molecule insures complete polymerizability of a methylolated and sulfonated product as those skilled in the art will readily appreciate. For reasons of structural predictability in the ultimate resole resin compositions of the invention, a more preferred class of such preferred class of products contains a single such sulfonic acid salt group per molecule each located in the para position relative to phenolic (nuclear) hydroxyl groups.

Although such methylolated, sulfonated products can be readily separated as solids or concentrates from an aqueous reaction product mixture (as by vacuum distillation of fluids, or the like), for use in this invention, such products are preferably used in the form of aqueous solutions containing from about 30 to 80 weight percent total of such products. More preferred such solutions contain from about 50 to 70 weight percent of such products.

Preferably, such an aqueous solution is prepared so as to contain very little (e.g. less than about 5 weight percent based on total dry weight of methylolated, sulfonated product) dissolved free formaldehyde, but it obviously can be prepared to contain higher percentages of such, depending upon reaction conditions employed, and the end uses intended for such.

Typically and preferably, a water soluble methylolated, sulfonated product used in this invention is composed largely of monomeric with some water soluble polynuclear derivatives thereof, the relative amount of polynuclear derivatives in any given such product being dependent upon the degree of advancement associated therewith, as those skilled in the art will appreciate.

In general, the mol ratio of combined formaldehyde to phenol sulfonic acid of Formula 1 in methylolated, sulfonated products (conveniently calculated from the starting phenol sulfonic acids used in this invention) can range from about 0.8:1 to 2:1, although ratios of from about 1.5:1 to 1.9:1 are preferred.

While Formula 1 compounds can be prepared by methods known to the prior art, one particularly preferred preparation method for the present invention involves reaction of phenol with sulfuric acid under conditions such that for each mol of phenol there is present at least about one mol of sulfuric acid. The reaction or contacting of phenol with sulfuric acid is conducted under liquid phase conditions using sub-atmospheric pressures of from about 20 to 29 in. Hg vacuum at temperatures ranging from about 85° to 95° C. The water generated through reaction of the sulfuric acid with the phenol is continuously removed by distillation from the reaction zone so as to promote a substantially complete reaction between sulfuric acid and phenol, thereby avoiding possible later problems of product purification.

The particular Formula 1 compound used (whether made as just described or otherwise) to make a methylolated, sulfonated product is water soluble and is neutralized and made basic with a base catalyst as indicated above before reaction with formaldehyde.

While methylolated, sulfonated resins used in this invention can be polymerized or advanced by the action of heat alone, they typically thermoset only with difficulty by heat alone (as by using severe heating conditions which result first in the formation of some degradation products which then allow thermosetting due to structure changes).

For convenience and stability in storing and handling a methylolated, sulfonated resin used in this invention, it is much preferred to keep such in a salt form, such as results inherently when one makes same in accordance with the teachings of this invention under basic conditions.

A second resin for use in this invention is conventionally made by the condensation of phenol with formaldehyde under base catalyzed (e.g. above pH 7 in water) conditions so that the condensate contains at least about 1 mol of combined formaldehyde per mol of phenol, and preferably such resin product has a mol ratio of from about 1.2:1 to 3:1 combined formaldehyde to phenol. Such resins are water soluble, as characterized above.

To produce a suitable conventional resole resin for use in this invention, one can, for example, neutralize and make basic a phenol in water solution, and then preferably from about 0.8 to 3.0 mols of formaldehyde per mol of phenol (more preferably from about 1.0 to 2.5 mols formaldehyde per mol of phenol) are mixed with the base catalyzed phenol. Water may be added with the formaldehyde, as when formalin is used. Also, a basic catalyst material conventionally known to the art of resole resins (referred to above), such as triethylamine, sodium hydroxide, or mixtures thereof (or the like) may be introduced into the reaction mixture. The pH of this reaction mixture is maintained above 7.0, and preferably in the range from about 7.5 to 9.5. Typical reaction temperatures range from about 50° C. up to the boiling point (i.e. reflux conditions) of the reaction mixture (temperatures of from about 70 to 80° C. being preferred). Convenient reaction times typically range from about 20 minutes to 4 hours. Aqueous liquid phase preparation conditions are generally but not necessarily used.

For purposes of this invention, such conventional resole resins are preferably but not necessarily employed in the form of aqueous solutions containing from about 30 to 80 weight percent of such resin. More preferred solutions contain from about 50 to 70 weight percent of such resins.

A preferred class of conventional water soluble resole resins suitable for use in this invention is characterized by the general formula:

(2)

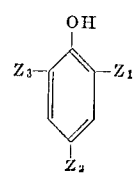

where $Z_1$, $Z_2$, and $Z_3$ are each selected from the group consisting of hydrogen and —$CH_2OH$, and, in any given molecule thereof, at least one of said Z's is —$CH_2OH$; and the water soluble polynuclear derivatives thereof (including dimers, trimers, and even tetramers).

The conventional resole resins employed in this invention preferably have a free formaldehyde content which is less than about 5 weight percent (based on total conventional resole resin weight).

To make a thermosettable two component mixed resin composition of this invention, one can simply mix a methylolated, sulfonated product prepared as described above with at least sufficient quantities of a base catalyzed thermosettable phenol-formaldehyde condensate (e.g. a conventional resole resin) to make the resulting resin system thermosettable. Simple physical (mechanical) procedures are generally suitable for mixing a preformed conventional resole resin with a preformed methylolated sulfonated product to make a thermosettable sulfonated resole resin composition of this invention.

For purposes of this invention, the term "thermosettable" has conventional reference to a resin which solidifies and crosslinks on heating to produce a substantially solvent insoluble mass which cannot be remelted.

Because the number of reaction sites available in a given conventional resole resin are variable from one such product to another, it will be appreciated by those skilled in the art that no definite numerical limitations can, or need be, used to describe for all cases the exact minimum quantity of a conventional resole resin which must be added to or composited with a methylolated, sulfonated product to make a resulting composite composition thermosettable by the action of heat alone. Commonly, as little as 10 parts by weight of conventional resole resin per 100 parts by weight of methylolated, sulfonated product is sufficient to impart thermosettability to the resulting composition. Up to 2000 or even more parts by weight of a conventional resole resin per 100 parts by weight of such methylolated, sulfonated product can advantageously be employed, the ratio used in any given instance being influenced by the particular product composition properties desired and end use intended. Preferably, for each 100 parts by weight of such methylolated, sulfonated product, one employs from about 30 to 1000 parts by weight (100 to 500 being more preferred) of such conventional resole resin. In any given instance, the minimum quantity of a particular conventional resole resin employed in a product composition is such that the total mixture of methylolated, sulfonated product and conventional resole resin is thermosettable at about 110° C.

Preferably, a two component composition of this invention is prepared in the form of an aqueous solution which contains a total of from about 30 to 80 (more preferably from about 50 to 70) weight percent (combined dry weight basis) of dissolved methylolated, sulfonated product and of dissolved conventional resole resin. At the time when a conventional resole resin is mixed with a methylolated, sulfonated product, it is desirable to have the methylolated, sulfonated product in a basic form so as to prevent premature or undesired reaction of the sulfonic acid group and (possibly) undesirable premature crosslinking of the product composition.

Those skilled in the art will appreciate from the foregoing teachings that one can conveniently (and preferably) prepare a thermosettable composition of this invention in a single vessel or reactor by appropriate reaction techniques and by addition of reactants in a proper sequence and order so as to prepare in situ both first resin and second resin. For example, one can react phenol with sulphuric acid to form Formula 1 compounds by the preferred route as taught above, and then this material can be neutralized and made basic with excess caustic as taught above. Next, such product is reacted with an excess of formaldehyde (e.g. formalin) to form a water soluble methylolated, sulfonated product as taught above. Subsequent addition of phenol (preferably immediately) produces a system which with heat will react with excess formaldehyde present to generate in situ a water soluble conventional resole resin. Excess formaldehyde can be added as taught above. Hence, as used herein, the term "mixing" in reference to blending conventional resole with methylolated phenol sulfonic acid includes in situ generation as described herein.

Also, those skilled in the art will realize that a resin composition of this invention may contain minor amounts (e.g. less than about 5 weight percent) of other materials which contain sulfonic acid moieties, which do not detract from the water solubility characteristics of a resin composition of this invention, and which are reactable with a resole-type phenolic resin, so that a resin composition of this invention containing such other materials is adapted to thermoset.

EMBODIMENTS

The following examples are set forth to illustrate more clearly the principles and practice of this invention to one skilled in the art and they are not intended to be restrictive but merely to be illustrative of the invention herein contained.

SULFONATED RESOLE PREPARATION

Example 1

400 grams of p-phenol-sulfonic acid are dissolved in 800 grams of water. To this mixture is added, with stirring and cooling, 220 grams of 50 percent NaOH. 300 grams of 50 percent formalin are then added and reacted for 3 hours at 60–65° C. The product is essentially monomeric; analysis thereof shows the presence of two O-hydroxymethyl groups on each phenol sulfonic acid nucleus demonstrating presence of methylolated phenol sulfonic acid salts. The product contains about 43 weight percent resin solids.

Example 2

To 200 grams phenol at 90° C. are added 210 grams of concentrated sulfuric acid over a 60 minute interval, maintaining the temperature at 90° C. The mixture is held an additional 60 minutes at 90° C. and water removed by vacuum distillation at 28" Hg. 400 grams of water are added and the mixture is cooled while adding 220 grams of 50 percent NaOH. 300 grams of 50 percent formalin are then added and reacted for 1 hour at 80° C. Infrared analysis of the product shows presence hydroxymethyl groups and sulfonic groups indicating presence of methylolated phenol sulfonic acid salts.

PREPARATION OF THERMOSETTABLE RESOLE RESIN SYSTEM WITH IN SITU GENERATED PHENOL-FORMALDEHYDE RESOLE

Example 3

400 grams of phenol sulfonic acid are dissolved in 400 grams of water and to this mixture is added, with cooling, 220 grams of 50 percent NaOH. 2500 grams of 50 percent formalin are added and the mixture reacted for 2 hours at 70° C. At this point, the presence of dissolved methylolated phenol sulfonic acid salts is shown by infra-red analysis. To the cooled reaction mixture is added 1600 grams phenol and sufficient 50 percent NaOH to adjust pH to the range 8–10. Reaction is then continued for 3–4 hours at 65–70° C. until the excess formaldehyde is consumed, and the reaction mixture is then cooled, thus forming a dissolved Formula 2 resole in combination with the previously formed methylolated phenol sulfonic acid salts. The product is adjusted with aqueous mineral acid to a pH in the range of from about 7 to 7.5 to produce a clear liquid resin. This composition, when spread on the surface of a cure plate and heated to about 130 to 180° C. dries and cures (thermosets) to a thermoset film. In this product, the mol ratio of formaldehyde to phenol sulfonic acid is about 2:1, and the mol ratio of formaldehyde to phenol is about 2.3:1. Also in this product, the parts by weight of resole resin to parts by weight of methylolated phenol sulfonic acid is about 470 to 100. This composition is water soluble at a pH of 7 to the extent that one part by weight of such composition when in about a 55 weight percent water solution is dilutable with at least about 20 parts by weight of additional water without causing any precipitation of such resin composition.

Example 4

400 grams of phenol sulfonic acid are dissolved in 150 grams of water and to this mixture is added, with cooling, 220 grams of 50 percent NaOH. 1350 grams of 50 percent formalin are added, and the mixture reacted for two hours at 70° C. At this point, the presence of methylolated phenol sulfonic acid salts is shown by infra-red analysis. To the cooled reaction mixture is added 900 grams phenol and sufficient 50 percent NaOH to adjust pH to the range of about 8 to 10. Reaction is then continued 3 to 4 hours at 65 to 75° C. until the free formaldehyde level is less than about 4 percent. The reaction mixture is then cooled to about 10° C. thus forming an aqueous solution of a resole of Formula 2 in combination with the previously formed methylolated phenol sulfonic acid salts. After sufficient aqueous mineral acid is added to adjust the pH to the range of about 6 to 7, a clear liquid resin product is produced. The resulting solution contains for each 100 parts by weight of methylolated phenol sulfonic acid compounds from about 350 to 450 parts by weight of conventional in situ generated resole. The product composition when spread on the surface of a steel plate at about 130 to 180° C. dries and cures to a thermoset film. In this product, the mol ratio of formaldehyde to phenol sulfonic acid is about 2:1 and the mol ratio of formaldehyde to phenol is about 2.1:1. This product composition is water soluble at a pH of 7 to the extent that one part by weight of such product composition when in about a 55 weight percent water solution is dilutable with at least about 10 parts by weight of additional water without causing any precipitation of such resin product composition.

THERMOSETTABLE RESIN PREPARED FROM SULFONATED RESOLE RESINS AND CONVENTIONAL RESOLE RESIN

Example 5

305 grams of a conventional 50 percent solids aqueous resole having a combined phenol/formaldehyde mol ratio of about 1:2.5 and cure time of 90 seconds are mixed with 160 grams of the product of Example 1 above. The liquid composition is adjusted with mineral acid to a pH of about 7.5 to produce a clear liquid resin product. In this product, the mol ratio of formaldehyde to phenol sulfonic acid is about 2.1:1, and the mol ratio of formaldehyde to phenol is about 2.5:1. Also in this product, the parts by weight of resole resin to parts by weight of methylolated phenol sulfonic acid is about 200 to 100. The resulting aqueous resin composition when applied to a hot plate at 110° C. minimum cures to a thermoset mass, and further has a cure time of about two minutes by the stroke cure test. This product resin composition is water soluble at a pH of 7 to the extent that one part by weight of such product resin composition when in about a 55 weight percent water solution is dilutable with at least about 25 parts by weight of additional water without causing any precipitation of such product resin composition.

Example 6

175 grams of a conventional aqueous 60 percent solids resole resin having a combined phenol/formaldehyde ratio of 1:1.5 are mixed with 240 grams of reaction product of Example 2 above. The liquid composition is adjusted with mineral acid to a pH of about 7.5 to produce a clear liquid resin product. In this product, the mol ratio of formaldehyde to phenol sulfonic acid is about 2:1, and the mol ratio of formaldehyde to phenol is about 1.5:1 (or, inverting, the mol ratio of phenol to formaldehyde is about 1:1.5). Also in this product, the parts by weight of resole resin to parts by weight of methylolated phenol sulfonic acid is about 100 to 100. This product resin composition is water soluble at a pH of 7 to the extent that one part by weight of such product resin composition when in about a 55 weight percent water solution is dilutable with at least about 20 parts by weight of additional water without causing any precipitation of such product resin composition.

SULFONATED RESOLE PREPARATION FROM PHENOL-SULFONIC ACID AND ALDEHYDE, AND ADMIXTURE WITH A PHENOL-FORMALDEHYDE RESOLE

Example 7

To 200 grams phenol at 90° C. are added 210 grams of concentrated sulfuric acid over a 60 minute interval, maintaining the temperature at 90° C. 400 grams of water are added and the mixture is cooled while adding 220 grams of 50 percent NaOH. 300 grams of 50 percent formalin are then added and reacted for 1 hour at 80° C. Infra-red analysis of the reaction mixture shows the presence of hydroxymethyl groups and sulfonic groups, indicating the presence of methylolated phenol sulfonic acid salts. The mixture is then dehydrated under reduced pressure to an aqueous resin having solids content of about 50 to 70 weight percent. 100 grams of the above-reaction mixture are admixed with 1200 grams of a preformed 70 percent solids aqueous solution of a conventional resole resin having a combined formaldehyde/phenol ratio of 1.9:1. Sufficient phosphoric acid solution is added during mixing to adjust the pH of the product composition to the range of about 6 to 7. A clear liquid results. In this product, the mol ratio of formaldehyde to phenol sulfonic acid is about 2:1 and the mol ratio of formaldehyde to phenol is about 1.9:1. The resulting solution contains for each 100 parts by dry weight of methylolated phenol sulfonic acid compounds about 1200 parts by dry weight of conventional resole resin compounds. A sample of the solution when deposited upon a hot plate at 110° C. thermosets to a solid mass. This product resin composition is water soluble at a pH of 7 to the extent that one part by weight of such product resin composition when in about a 55 weight percent water solution is dilutable with at least about 15 parts by weight of additional water without causing any precipitation of such product resin composition.

Example 8

To 200 grams phenol at 90° C. are added 210 grams of concentrated sulfuric acid over a 60 minute interval, maintaining the temperature at 90° C. 400 grams of water are added and the mixture is cooled while adding 220 grams of 50 percent NaOH. 300 grams of 50 percent formalin are then added and reacted for 1 hour at 80° C. Infra-red analysis of the reaction mixture shows the presence of hydroxymethyl groups and sulfonic groups, indicating the presence of methylolated phenol sulfonic acid salts. The mixture is then dehydrated under reduced pressure to an aqueous resin having solids content of about 60 to 70 weight percent and less than 5 weight percent free formaldehyde. 100 grams of the above reaction mixture are admixed with 320 grams of a preformed 70 percent solids aqueous solution of a resole having a combined formaldehyde/phenol ratio of 1.9:1. Sufficient phosphoric acid solution is added during mixing to adjust the pH of the product composition to the range of about 6 to 7. A clear liquid results. In this product, the mol ratio of formaldehyde to phenol sulfonic acid is about 2:1, and the mol ratio of formaldehyde to phenol is about 1.9:1. The resulting solution contains for each 100 parts by weight of methylolated phenol sulfonic acid compounds about 300 parts by weight of conventional resole resin compounds. A sample of the solution when deposited upon a hot plate at 110° C. thermosets to a solid mass. This product resin composition is water soluble at a pH of 7 to the extent that one part by weight of such product resin composition when in about a 55 weight percent water solution is dilutable with at least about 20 parts by weight of additional water without causing any precipitation of such product resin composition.

Example 9

When each of the resins of Examples 3, 4, 5, 6, 7, and 8 is used to saturate by immersion a porous sheet of alpha-cellulose paper, followed by air drying and thermosetting at 375° F. for five minutes, it is found that the product treated sheet displays ion-exchange properties.

In one method of preparation of a composition of this invention, one contacts under base catalyzed, liquid phase, aqueous conditions at temperatures in the range of from about 70 to 90° C. a molar excess of formaldehyde with at least one phenol sulfonic acid of Formula 1 above so as to condense such acid with formaldehyde and thereby produced a solution containing such methylolated acid. Thereafter, phenol is added to the system (and optionally, formaldehyde) so as to produce in such liquid phase a formaldehyde to phenol mol ratio in the range from about 1.0 to 2.5. Next, the resulting base catalyzed mixture is maintained at a temperature in the range of from about 50 to 70° C. so as to condense such phenol with formaldehyde and produce a water soluble resole resin.

What is claimed is:

1. A phenolic resin composition adapted for use as an ion-exchange resin when thermoset comprising in combination:
    (A) a first resin consisting essentially of a base catalyzed condensate of formaldehyde with at least one phenol sulfonic acid characterized in its pure acid form by the general formula:

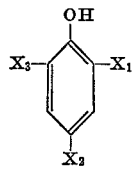

where $X_1$, $X_2$, and $X_3$ are each individually selected from the group consisting of hydrogen, and —$SO_3H$, and, in any given molecule thereof, at least one of said X's is —$SO_3H$, and at least one other of said X's is hydrogen, and
    (B) a second resin consisting essentially of a base catalyzed condensate of phenol with formaldehyde,
    (C) there being from about 10 to 2000 parts by weight of said second resin for each 100 parts by weight of said first resin,
    (D) said first resin and said second resin together in such a combination being water soluble at a pH of about 7 to the extent that one part by weight of such combination when in about a 55 weight percent water solution is dilutable with at least about 5 parts by weight of additional water without precipitation of such combination.

2. An aqueous solution having a pH of from about 6.5 to 8.0 and comprising from 5 to 80 weight percent of the resin composition of claim 1 and inversely 20 to 95 weight percent of water.

3. The composition of claim 1 wherein said first resin has a combined mole ratio of from about 0.8:1 to 2:1 formaldehyde to said phenol sulfonic acid.

4. The composition of claim 1 wherein said second resin has a combined mole ratio of from about 1.2:1 to 3:1 formaldehyde to phenol.

5. The composition of claim 1 wherein the resins are made in a common reaction zone sequentially.

6. The solution of claim 2 containing from 30 to 80 weight percent of said resin composition and inversely from 20 to 70 weight percent of water.

7. The thermoset composition of claim 1.

8. The composition of claim 1 wherein there are from about 30 to 1000 parts by weight of said second resin for each 100 parts by weight of said first resin.

9. A method for making a water soluble sulfonated phenolic resin composition comprising the steps of:
    (A) first contacting under base catalyzed, liquid phase, aqueous conditions at temperatures in the range from about 75 to 90° C. a molar excess of formaldehyde with at least one phenol sulfonic acid characterized in its pure acid form by the general formula:

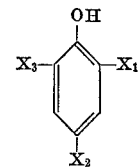

where $X_1$, $X_2$, and $X_3$ are each individually selected from the group consisting of hydrogen, and —$SO_3H$, and, in any given molecule thereof, at least one of said X's is —$SO_3H$, and at least one other of said X's is hydrogen, whereby methylolated phenol sulfonic acid is produced in water solution,
    (B) admixing with the resulting reaction mixture phenol, and, optionally, formaldehyde so as to create a mol ratio of formaldehyde to phenol in said resulting mixture of from about 1.0 to 2.5, and
    (C) thereafter maintaining the temperature of the product mixture in the range of from about 50 to 70° C. so as to condense said phenol with said formaldehyde and produce a water soluble resole resin.

10. A phenolic resin composition adapted for use as an ion-exchange resin when thermoset comprising in combination:
    (A) a first resin consisting essentially of a base catalyzed condensate of formaldehyde with at least one phenol sulfonic acid characterized in its pure acid form by the general formula:

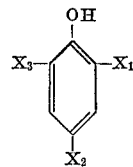

where $X_1$, $X_2$, and $X_3$ are each individually selected from the group consisting of hydrogen, and —$SO_3H$, and, in any given molecule thereof, at least one of said X's is —$SO_3H$, and at least one other of said X's is hydrogen, wherein the mole ratio of formaldehyde to phenol-sulfonic acid is in the range of 0.8:1 to 2:1;
    (B) a second resin consisting essentially of a base catalyzed condensate of phenol with formaldehyde in the mole ratio of formaldehyde to phenol in the range of 1.2:1 to 3:1;
    (C) there being from about 100 to 500 parts by weight of said second resin for each 100 parts by weight of said first resin;
    (D) said first resin and said second resin together in such a combination being water soluble at a pH of about 7 to the extent that one part by weight of such combination when in about a 55 weight percent water solution is dilutable with at least about 5 parts by weight of additional water without precipitation of such combination.

11. An aqueous solution having a pH of from about 6.5 to 8.0 comprising from 50 to 70 weight percent of the resin composition of claim 10 and inversely 30 to 50 weight percent of water.

(References on following page)

References Cited

UNITED STATES PATENTS

| | | | |
|---|---|---|---|
| 2,179,038 | 11/1939 | Guthke | 260—49 |
| 2,204,539 | 6/1940 | Wassenegger | 23—1 |
| 3,207,652 | 9/1965 | Shannon | 161—93 |
| 3,410,718 | 11/1968 | Smith | 117—138.8 |
| 3,442,859 | 5/1969 | Lipowsky et al. | 260—49 |

OTHER REFERENCES

Kressman et al.: J. Chem. Soc., 1949, 1190–93.

MELVIN GOLDSTEIN, Primary Examiner

U.S. Cl. X.R.

260—29.3, 49, 838